(12) United States Patent
Sauer

(10) Patent No.: US 7,339,755 B2
(45) Date of Patent: Mar. 4, 2008

(54) RING DEVICE WITH OPTICAL FOCUSING MECHANISM

(76) Inventor: Don R. Sauer, 1499 Cliff Dr., San Jose, WA (US) 95132

( * ) Notice: Subject to any disclaimer, the term of this patent is extended or adjusted under 35 U.S.C. 154(b) by 163 days.

(21) Appl. No.: 11/284,380

(22) Filed: Nov. 21, 2005

(65) Prior Publication Data

US 2007/0115427 A1 May 24, 2007

(51) Int. Cl.
*G02B 27/02* (2006.01)
(52) U.S. Cl. .................. 359/804; 359/802; 359/805; 63/1.12
(58) Field of Classification Search .............. 351/158; 359/804–807, 809–813, 815, 817; 63/1.12, 63/15
See application file for complete search history.

(56) References Cited

U.S. PATENT DOCUMENTS

| | | | | |
|---|---|---|---|---|
| 1,536,365 A | * | 5/1925 | Wiseman | 63/1.12 |
| 4,133,603 A | * | 1/1979 | Inouye et al. | 359/815 |
| 4,416,074 A | | 11/1983 | Guerrero et al. | 40/364 |
| D292,499 S | | 10/1987 | Eddy | D11/2 |
| 5,193,360 A | | 3/1993 | Lovegrove | 63/15 |
| 5,528,320 A | * | 6/1996 | Specht et al. | 351/106 |
| 5,608,203 A | | 3/1997 | Finkelstein et al. | 235/487 |
| 5,793,462 A | | 8/1998 | Sample et al. | 351/41 |
| 6,533,414 B2 | | 3/2003 | Newler | 351/158 |
| 6,540,107 B1 | | 4/2003 | Admony | 222/78 |
| 6,705,720 B2 | | 3/2004 | Brown et al. | 351/41 |
| 6,899,423 B1 | | 5/2005 | Brazell | 351/157 |

* cited by examiner

*Primary Examiner*—Huy Mai
(74) *Attorney, Agent, or Firm*—Brett A. Hertzberg; Merchant & Gould PC

(57) ABSTRACT

A ring device is adapted for wearing on at least one finger of a user. The ring device includes a wearable main body portion and an optical member that is moveably affixed thereto. The optical member can be positioned in at least two positions: a viewing position, and a storage position. The optical member may be moved relative to the main body portion through a number of positioning mechanisms including: a hinged member, a sliding member, and a rotating member. The viewing position may include any number positions for viewing an object in a field of view. The storage position corresponds to an alignment of the optical member with the main body such that the device is aesthetically pleasing. A face of the main body may include an insignia or other decorative design that is viewable through the optical member, and may optionally be removable by the user.

16 Claims, 6 Drawing Sheets

RING DEVICE WITH OPTICAL FOCUSING MECHANISM

FIELD OF THE INVENTION

The present invention generally relates to optical focusing mechanisms such as reading glasses, magnifying glasses, and the like. More particularly, the present invention relates to a ring device is wearable on a finger of a user. The ring device includes a wearable main body portion, and an optical focusing portion that is moveably affixed thereto to permit the user to position the optical member for viewing an object in a field of view.

BACKGROUND

Many people suffer from vision impairments. A person is said to be "near-sighted" when objects within a certain range appear very clearly, while distant object appear blurry at all times. A person is said to be "far-sighted" when close objects appear out of focus, while distant object appear to be in focus.

Nearsightedness is the result of a condition call myopia, which occurs when light entering the eye focuses in front of the retina instead of directly on it. Myopia is caused by a cornea that is steeper is shape, or an eye that is longer in depth when compared to an eye with normal 20/20 vision. Nearsighted people typically see well up close, but have difficulty seeing far away.

Myopia is often discovered in school-age children who report having trouble seeing the chalkboard. Near-sightedness usually becomes progressively worse through adolescence and stabilizes in early adulthood. Myopia is a condition that is typically inherited, and is often corrected with Vision can with glasses, contact lenses, or surgical procedures once the persons vision has stabilized in adulthood.

Farsightedness is a result of a condition called hyperopia, which occurs when light entering the eye is focused behind the retina instead of directly on the retina. Hyperopia is caused by a cornea that is flatter in shape, or an eye that is shorter in depth when compared to an eye with normal 20/20 vision. While most farsighted people usually have trouble seeing up close, farsighted people may also have difficulty seeing far away as well.

Young people with mild to moderate hyperopia are often able to see clearly because their natural lens can adjust, or accommodate to increase the eye's focusing ability. However, the eye gradually loses the ability to accommodate at around the age of 40 years old, and the blurred vision from hyperopia becomes much more apparent. Young patients may or may not require glasses or contact lenses to correct for hyperopia depending on their ability to compensate for their farsightedness with accommodation. Glasses or contact lenses are typically required for older patients.

Although many vision problems can be corrected with contact lenses, there are some exceptions. Some of the conditions that might keep a person from wearing contact lenses are: frequent eye infections, severe allergies, dry eye (improper tear film), a work environment that is very dusty or dirty and inability to handle and care for the lenses properly. Also, some vision impairments simply cannot be corrected by contact lenses.

There are some reading lenses and magnifying glasses that are available to assist people in reading books, documents and the like without the use of reading glasses. These are particularly useful when the person encounters small print during an activity which makes it inconvenient or difficult to stop and put on reading glasses.

One example reading lens device is a book mark such as that shown in U.S. Pat. No. 3,140,883 issued to R. L. Anthony on Jul. 14, 1964. The illustrated book mark can be integrally attached to a book such as a telephone directory or a dictionary, where the end of the book mark includes a sealed pocket that holds a plastic magnifying lens.

A pocket sized magnifying device is shown in U.S. Pat. No. 3,409,347 issued to R. Vogel on Nov. 5, 1968. The illustrated pocket sized magnifying device includes a pocket pouch adapted to be carried in the breast or hip pocket of the user or in a purse or wallet. The lens in the device is formed of a transparent plastic sheet that has a lens molded into its upper surface. The lens is slidably retracted into and extended out of the pocket.

A credit card with a magnifying lens is shown in U.S. Pat. No. 5,608,203 to Finkelstein et al. on Mar. 4, 1997. The illustrated device is a credit card that includes a rigid base with a transparent area. Fresnel contours are formed on an upper surface of the transparent area, which is illustrated as a horizontal window in the central region of the credit card. The transparent area and the Fresnel contours are joined to form a magnifying lens for the credit card device.

BRIEF DESCRIPTION OF THE DRAWINGS

Non-limiting and non-exhaustive embodiments are described with reference to the following drawings.

DETAILED DESCRIPTION OF THE PREFERRED EMBODIMENT

Figure 1A:
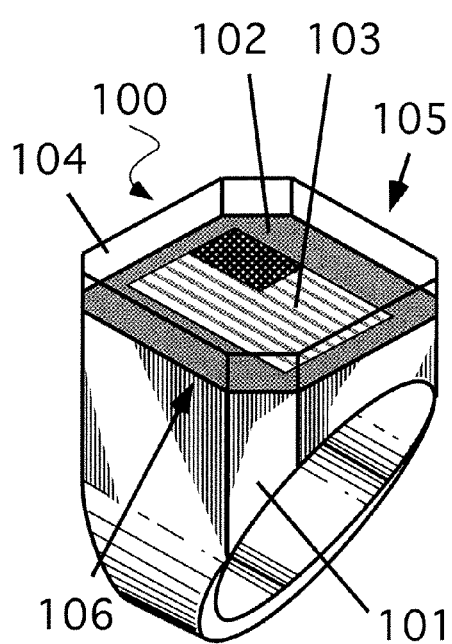
FIGS. 1A and 1B are diagrams illustrating a ring device with an optical focusing mechanism that is arranged in accordance an embodiment of the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, a ring device is adapted for wearing on at least one finger of a user. The ring device includes a wearable main body portion and an optical member that is moveably affixed thereto. The optical member can be positioned in at least two positions: a viewing position, and a storage position. The optical member may be moved relative to the main body portion through a number of positioning mechanisms including: a hinged member, a sliding member, and a rotating member. The viewing position may include any number positions for viewing an object in a field of view. The storage position corresponds to an alignment of the optical member with the main body such that the device is aesthetically pleasing. A face of the main body may include an insignia or other decorative design that is viewable through the optical member, and may optionally be removable by the user.

Figure 1B:
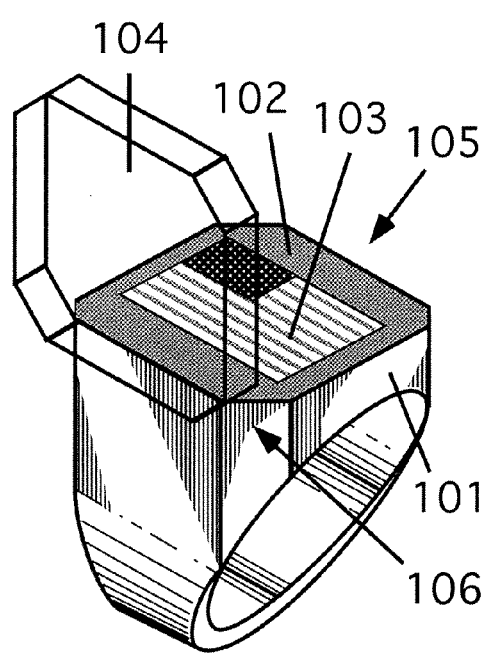

FIGS. 1A and 1B are diagrams illustrating a ring device (100) with an optical focusing mechanism that is arranged in accordance an embodiment of the present disclosure. Ring device 100 includes a main body (101) and an optical member (104). The main body (101) includes a face portion (102). An optional design (103) may be positioned on the face portion (102). The optical member (104) is coupled to the main body (101) through a coupling member (106) which will described in further detail with respect to FIGS. 4A, 4B, 5A, 5B, 6A and 6B. A latching member (105) can optionally be arranged to maintain the optical member (104) in alignment with the main body (101).

The main body portion (101) is band shaped for wearing on a finger of the user. Although the main body portion is illustrated as a band that is wearable on a single finger, other configurations that are wearable on multiple fingers are considered within the scope of the present disclosure. The face portion (102) is substantially arranged in a plane that is aligned with the finger (or fingers) when the main body (101) is worn by the user. The face portion (102) of the main body has a substantially flat surface, and may have an top view profile that is substantially square in shape, round in shape, elliptical in shape, or some other desired shape. A decorative design (103) may be present on the face (102).

The optical member (104) is moveable between at least two alignment positions relative to the main body (101). In a first alignment position, the optical member (104) is substantially in alignment with the face portion (102) of the main body (101) as illustrated in FIG. 1A. In a second alignment position, the optical member (104) is moved out of alignment with the face portion (102) of the main body (101) for viewing use as illustrated in FIG. 1B. When worn in an upright position, the user can view the face portion (102) of the main body (101) through the optical member (104) in the first position. The decorative design (103) can also be viewed through the optical member (104) when the optical member (104) is in the first alignment position.

The decorative design (103) can be provided as a decorative insert, an engraving, an electroplating, an epoxy paint, or any other means for providing such aesthetic design. The insert-type decorative design can be affixed to the face portion of the main body, for example, by means of a magnetic coupling (e.g., the insert is an opposite magnetic polarity to the main body), a frictional coupling, a solder coupling, an epoxy coupling, or any other coupling mechanism.

The optical member (104) can be formed from a number of materials, including but not limited to, at least one of: a glass material, a plastic material, a polycarbonate material, or any other materials that is sufficiently transparent for operation as a lens device. The formed lens can be provided as at least one of: a magnification lens, a focusing lens, a Fresnel lens, a spherical lens, an anti-stigmatic lens, a concave lens, a convex lens, a polarizing lens, a filtering lens, a circular lens, an aspheric lens, an elliptical lens, a bifocal lens, a trifocal lens, a progressive addition lens, and a multi-focal lens.

The coupling member (106) is provided between the optical member (104) and the main body (101) such that at least the first and second alignment positions can be provided. In one example, the coupling member (106) is integrally formed with the optical member (104). In another example, the coupling member (106) is affixed to the optical member (104) such as by a hinge, pin, groove, or some other coupling mechanism. In still another example, the coupling member (106) is integrally formed with the main body (101). In yet another example, the coupling member (106) is affixed to the main body. The coupling member is also arranged to maintain the alignment of the optical member (104) relative to the main body (101). The optional latching member (105) may be provided to maintain the alignment of the optical member (104) relative to the main body (101) when in the first position (e.g. closed position).

Figure 2:
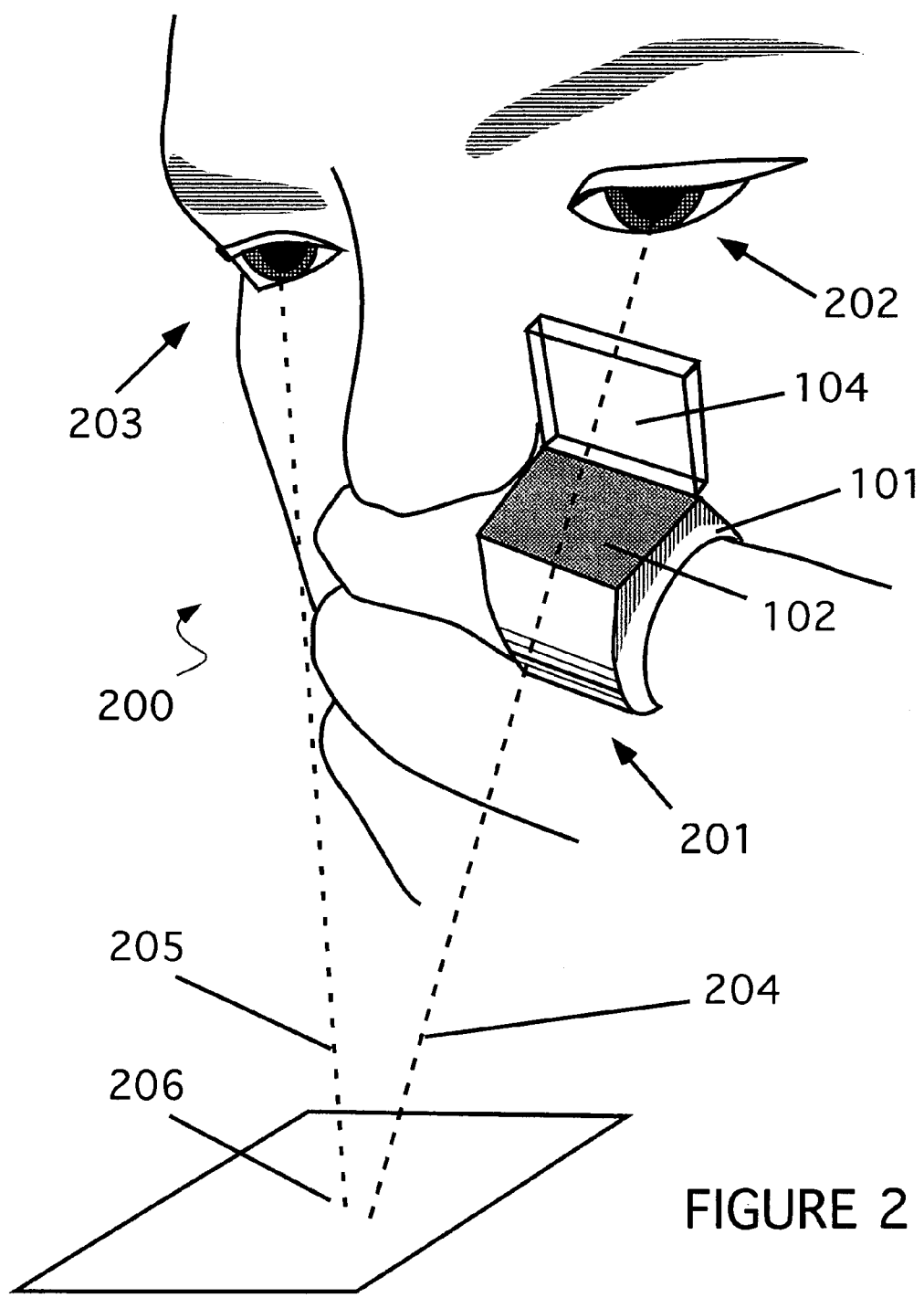
FIG. 2 is a diagram illustrating an example ring device with an optical focusing element in an example operating environment, in accordance with some embodiments of the present disclosure.

FIG. 2 is a diagram illustrating an example ring device with an optical focusing element in an example operating environment (200), in accordance with some embodiments of the present disclosure. The ring device in FIG. 2 is substantially similar to the ring device from FIGS. 1A and 1B.

The ring device that is worn by a user on a finger (201) is positioned near the preferred eye (202) of the user. The optical member (104) of the ring device is aligned in a viewing position (e.g. an open position for a hinged device) relative to the main body (101). In the viewing position, the face portion (102) of the main body (101) is out of alignment with the optical member (104). An object in a field of view (206) is viewed by the preferred eye (202) of the user along a first viewing axis (204) though the optical member (104) of a ring device. The other or non-preferred eye of the user (203) views the object in the field of view (206) along a second viewing axis (205). Although the user only has a single optical device, the user is still able to visual process the optical information to focus normally on the object in the field of view (206).

Figure 3:
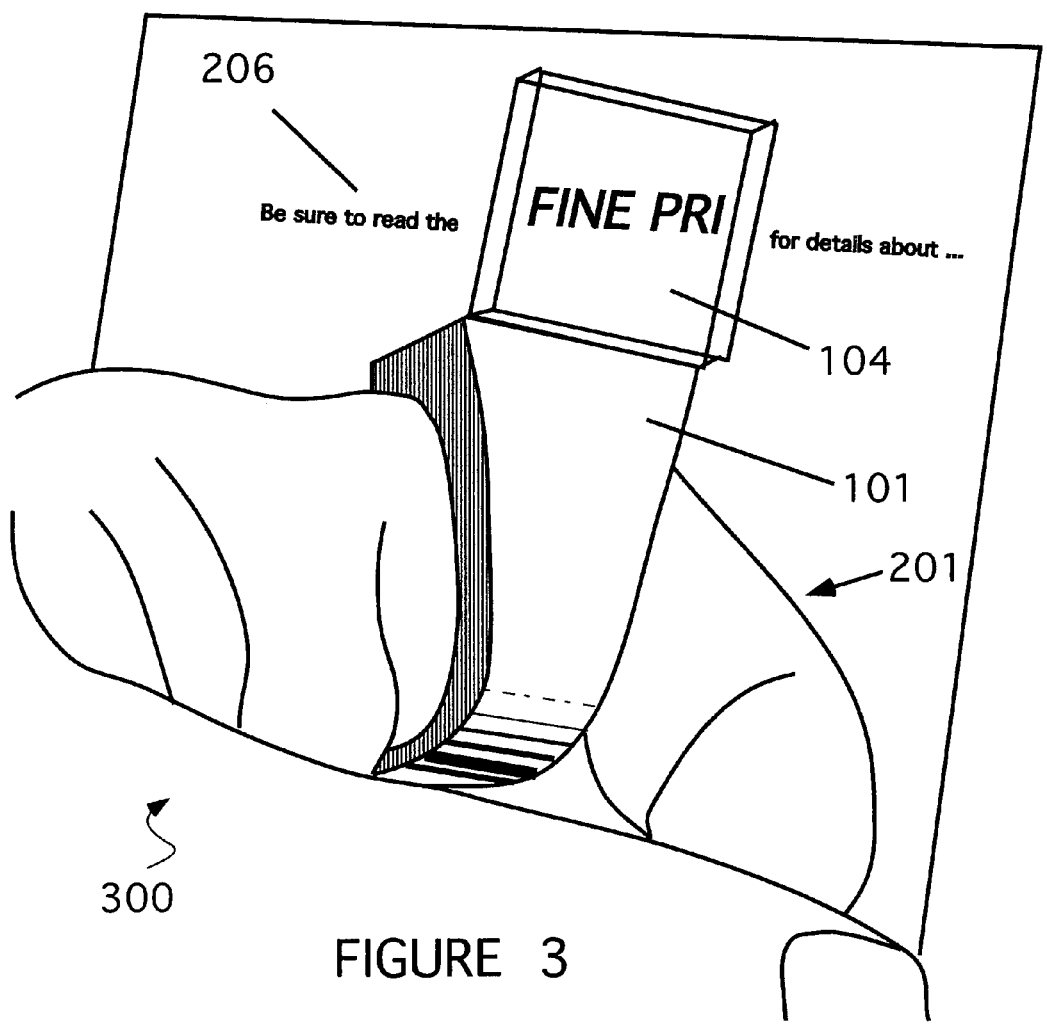
FIG. 3 is a diagram illustrating an example ring device with an magnification element in an example operating environment, in accordance with some embodiments of the present disclosure.

FIG. 3 is a diagram illustrating an example ring device with a magnification element in an example operating environment (300), in accordance with some embodiments of the present disclosure. The ring device in FIG. 3 is substantially similar to the ring device from FIGS. 1A, 1B and 2. The ring device is positioned near readable text that is located in the field of view (206). The example device illustrates that magnification of the text is possible when the lens in the optical member (104) is a magnification type lens.

Figure 4A:
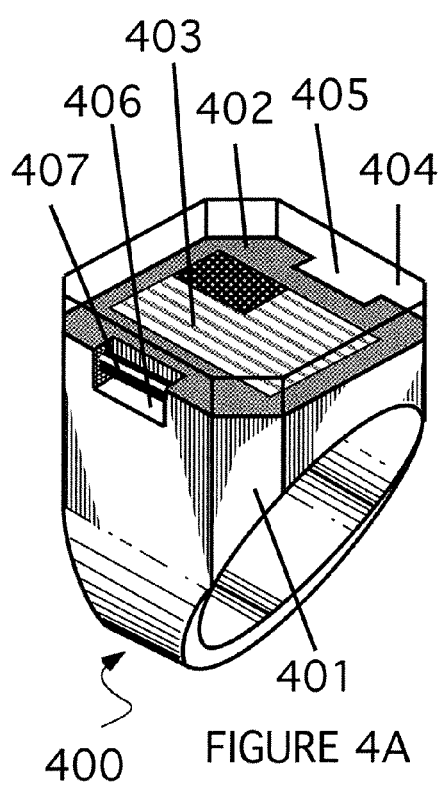
FIGS. 4A and 4B are diagrams illustrating an example ring device with a hinging mechanism that is adapted for movement of an optical focusing element, in accordance with some embodiments of the present disclosure.
Figure 4B:
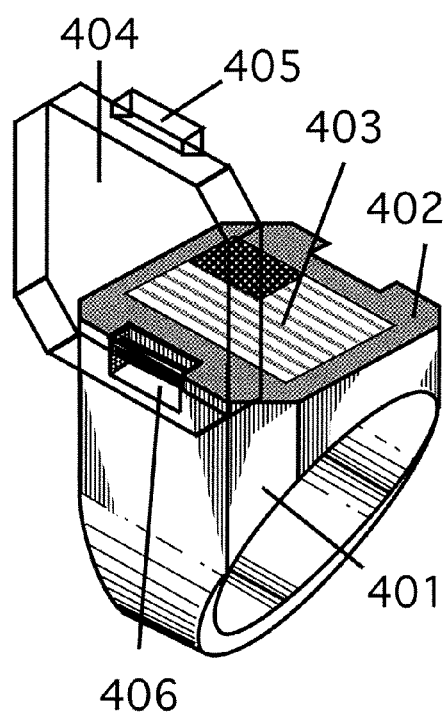

FIGS. 4A and 4B are diagrams illustrating an example ring device (400) with a hinging mechanism that is adapted for movement of an optical element, in accordance with some embodiments of the present disclosure. Ring device 400 includes a main body (401) and an optical member (404). The main body (401) includes a face portion (402). An optional design (403) may be positioned on the face portion (402). The optical member (404) is coupled to the main body (401) through a coupling member (406). A latching member (405) can optionally be arranged to maintain the optical member (404) in alignment with the main body (401).

Ring device 400 is substantially similar to ring device 100, where the coupling mechanism (406) is represented as a hinge. The hinge may be formed as a pin-type hinge that includes a pin member that is coupled through a portion of the optical member (404) into a hole that is formed in the main body (401). The pin member may be formed as a metal insert, a plastic insert, or may be integrally formed as part of the optical member (404). The receiving hole for the pin member may be formed, for example, as a detent in the main body (401).

The coupling mechanism in FIG. 4A is positioned in at a first position where the optical member (404) is in substantial alignment with the main body (401). For the hinging arrangement that is illustrated, the first position corresponds to a closed position where the face portion (402) of the main body (401) is aligned in the same plane as a corresponding face of the optical member (404). The coupling mechanism in FIG. 4B is positioned in a second position where the optical member (404) is substantially out of alignment with the main body (401) for viewing by the user. For the hinging arrangement that is illustrated, the second position corresponds to an open position where the face portion (402) of the main body (401) is substantially orthogonal to a corresponding face of the optical member (404).

In one example, a detent means can be provided in the main body such that at least one of the first alignment position and the second alignment position can be maintained. In another example, a frictional engagement can be provided between the optical member and the main body to maintain at least one of the first alignment position and the second alignment position.

In one example, the latching mechanism (405) is integrally formed with the optical member (404) such that the main body (401) couples to the latching mechanism (405) when the optical member (404) is in a first alignment position (e.g., a closed position) as shown in FIG. 4A. In another example, the latching mechanism (405) is integrally formed with the main body (401) such that the latching mechanism (405) couples to the main body (401) when the optical member (404) is in a first alignment position (e.g., a closed position) as shown in FIG. 4A. In another example, the latching mechanism is eliminated.

Figure 5A:
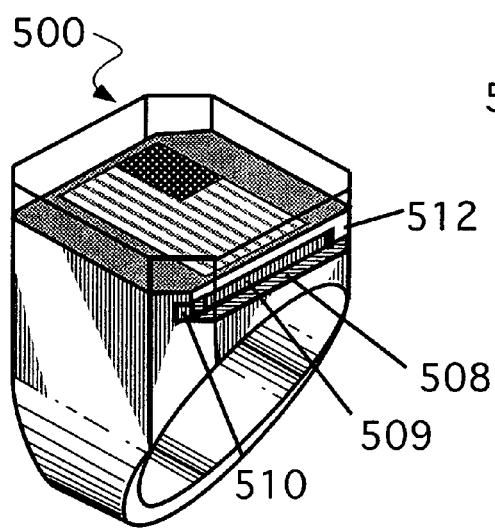
FIGS. 5A and 5B are diagrams illustrating another example ring device with a sliding mechanism that is adapted for movement of another optical focusing element, in accordance with some embodiments of the present disclosure.
Figure 5B:
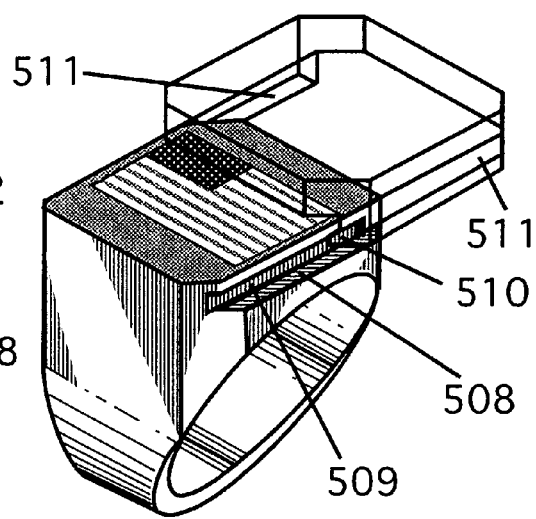

FIGS. 5A and 5B are diagrams illustrating another example ring device (500) with a sliding mechanism that is adapted for movement of another optical focusing element, in accordance with some embodiments of the present disclosure. Ring device 500 is substantially similar to ring device 100 and 400, where the coupling mechanism is represented as a sliding coupling member that is formed between the optical member and the main body along a longitudinal direction with respect to the face of the housing.

In one example, the sliding coupling member can be integrally formed with at least one of the optical member and the main body. In another example, the sliding member can be affixed to at least one of one of the optical member and the main body.

As illustrated in FIG. 5A, a sliding coupling member can be integrally formed in the main body as a groove (509) that is formed along a longitudinal axis of the main body. The length of the groove forms a ledge (508) in the main body. One end of the groove has a blocking portion (512) for preventing further movement of the optical member (511). The optical member (511) has a mating portion (510) for coupling with the main body in the groove (509).

The coupling mechanism in FIG. 5A is positioned in at a first position where the optical member is in substantial alignment with the main body. For the sliding coupling arrangement that is illustrated, the first position corresponds to a closed position where the face portion of the main body is aligned with the face of the optical member. The coupling mechanism in FIG. 5B is positioned in a second position where the optical member (511) is substantially out of alignment with the main body for viewing by the user. For the sliding coupling arrangement that is illustrated, the second position corresponds to an open position where the face portion of the main body is substantially adjacent to the optical member (511), while still in the same plane as the optical member.

Figure 6A:
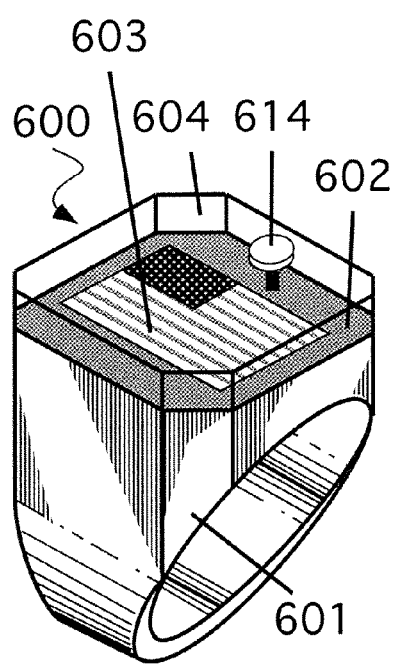
FIGS. 6A and 6B are diagrams illustrating still another example ring device with a rotating mechanism that is adapted for movement of still another optical focusing element, in accordance with some embodiments of the present disclosure.
Figure 6B:
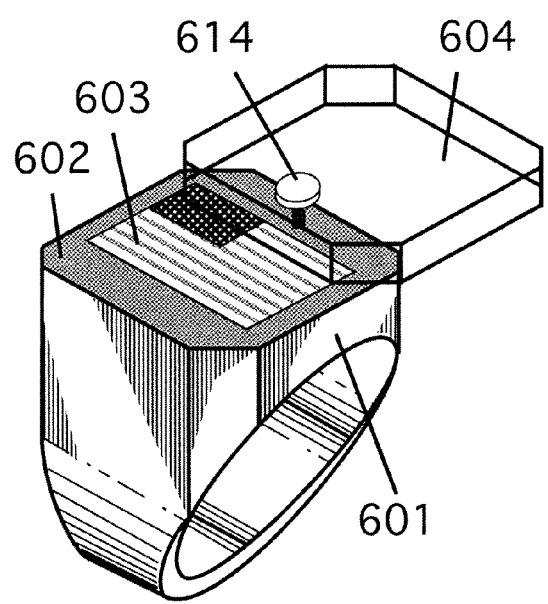

FIGS. 6A and 6B are diagrams illustrating still another example ring device (600) with a rotating mechanism that is adapted for movement of still another optical focusing element, in accordance with some embodiments of the present disclosure. Ring device 600 is substantially similar to ring devices 100, 400 and 500, where the coupling mechanism is represented as a rotating coupling member (614) that is formed between the optical member (604) and the main body (601) proximate to an end of the optical member and proximate to an end of the face portion (602) of the main body.

In one example, the rotating coupling member (614) can be integrally formed with at least one of the optical member and the main body. In another example, the rotating coupling member (614) can be affixed to at least one of one of the optical member and the main body such as by a pin-type device.

As illustrated in FIG. 6A, a rotating coupling member (614) is affixed to the main body (601) as a pin-type device. A hole is formed through the surface of the optical member (604), and also into the surface of the main body (601) in the face portion (602). The pin is inserted through the formed hole, and affixed to the main body such that the pin does not fall out during use.

The coupling mechanism in FIG. 6A is positioned in at a first position where the optical member (604) is in substantial alignment with the main body (601). For the rotating coupling arrangement that is illustrated, the first position corresponds to a closed position where the face portion of the main body (601) is aligned with the face portion of the optical member (604). The coupling mechanism in FIG. 6B is positioned in a second position where the optical member (604) is substantially out of alignment with the main body (601) for viewing by the user. For the rotating coupling arrangement that is illustrated, the second position corresponds to an open position where the face portion of the main body is substantially adjacent to the optical member (604), while still in the same plane as the optical member. Also, the pin coupling arrangement is positioned near an edge, side or end of the face portion of the main body (601) such that the design on the face (603) is clear from the coupling arrangement.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A ring apparatus that is wearable on at least one finger of a user for optical viewing an object in a field of view by an eye of the user, comprising:
   a main body that is wearable on the at least one finger of the user;
   a face portion of the main body that is in substantial alignment with a plane of the at least one finger;
   an optical member; and
   a coupling member that is arranged to movably couple the optical member to the main body, wherein the coupling member is arranged to provide at least a first alignment position and a second alignment position, wherein the optical member is substantially aligned with the face portion of the main body in a first alignment position, and wherein the optical member is substantially aligned for viewing the object in the field of view by the eye of the user in the second alignment position, wherein the coupling member comprises a sliding member that is formed between the optical member and the main body along a longitudinal direction with respect to the face portion of the main body.

2. The ring apparatus of claim 1, wherein the coupling member is integrally formed with at least one of the optical member and the main body.

3. The ring apparatus of claim 1, further comprising a compartment that is formed in the face portion of the main body for insertion of a decorative design by a user, wherein the decorative design is viewable through the optical member when the optical member is in the first alignment position.

4. The ring apparatus of claim 1, further comprising a compartment that is formed in the face portion of the main body for insertion of a decorative design by a user, wherein the decorative design is insertable into the compartment when the optical member is in the second alignment position.

5. The ring apparatus of claim 1, further comprising a compartment that is formed in the face portion of the main body for insertion of a decorative design, wherein the decorative design is affixed in the compartment by at least one of: a magnetic coupling, a frictional coupling, an epoxy coupling, and a soldered coupling.

6. The ring apparatus of claim 1, further comprising: a latching mechanism that is arranged to maintain at least one of the first alignment position and the second alignment position.

7. The ring apparatus of claim 1, further comprising a frictional means that is arranged to maintain at least one of the first alignment position and the second alignment position.

8. The ring apparatus of claim 1, further comprising a detent means that is arranged to maintain at least one of the first alignment position and the second alignment position.

9. The ring apparatus of claim 1, wherein the optical member comprises at least one of: a magnification lens, a focusing lens, a Fresnel lens, a spherical lens, an antistigmatic lens, a concave lens, a convex lens, a polarizing lens, a filtering lens, a circular lens, an aspheric lens, an elliptical lens, a bifocal lens, a trifocal lens, a progressive addition lens, a multi-focal lens, a glass lens, a plastic lens, and a polycarbonate lens.

10. A ring device that is wearable on at least one finger of a user for optical viewing an object in a field of view by an eye of the user, comprising:
 a main body that is wearable on the at least one finger of the user;
 a face portion of the main body that is in substantial alignment with a plane of the at least one finger;
 a design that is positioned about the face portion of the main body;
 an optical means that is selectively aligned with the face portion of the main body; and
 a coupling means that is arranged to movably couple the optical means to the main body,
wherein the coupling means is configured to position the optical means in at least a first alignment position and a second alignment position, wherein the optical means is substantially aligned with the face portion of the main body in the first alignment position such that the design is viewable through the optical means, and wherein the optical means is substantially aligned for viewing the object in the field of view by the eye of the user in the second alignment position, wherein the coupling means comprises a sliding member that is formed between the optical means and the main body along a longitudinal direction with respect to the face portion of the main body.

11. The ring device of claim 10, wherein the coupling means is arranged to cooperate with the optical means such that the face portion of the main body does not substantially occlude viewing the object in the field of view when the optical member is in the second alignment position.

12. The ring device of claim 10, wherein the coupling means is integrally formed with at least one of the optical means and the main body.

13. The ring device of claim 10, wherein the design is affixed to the face portion of the main body with at least one of: an epoxy means, a solder means, a magnetic means, and a frictional engagement means.

14. The ring device of claim 10, wherein the optical means comprises at least one of: a magnification lens, a focusing lens, a Fresnel lens, a spherical lens, an antistigmatic lens, a concave lens, a convex lens, a polarizing lens, a filtering lens, a circular lens, an aspheric lens, an elliptical lens, a bifocal lens, a trifocal lens, a progressive addition lens, a multi-focal lens, a glass lens, a plastic lens, and a polycarbonate lens.

15. A decorative ring device that is wearable on at least one finger of a user for optical viewing an object in a field of view by an eye of the user, comprising:
 a main body that is wearable on the at least one finger of the user;
 a face portion of the main body that is in substantial alignment with a plane of the at least one finger;
 a removable stylistic design that is positioned about the face portion of the main body;
 an optical means that is selectively aligned with the face portion of the main body; and
 a coupling means that is arranged to movably couple the optical means to the main body,
wherein the coupling means is configured to position the optical means in at least a first position and a second position, wherein the optical means is substantially aligned with the face portion of the main body in the first alignment position such that the stylistic design is viewable through the optical means, and wherein the optical member is substantially aligned for viewing the object in the field of view by the eye of the user in the second alignment position, wherein the coupling means comprises a sliding member that is formed between the optical means and the main body along a longitudinal direction with respect to the face portion of the main body.

16. The decorative ring device of claim 15, wherein the stylistic design is arranged for removal by the user when the optical means is in the second alignment position.

* * * * *